(12) United States Patent
Rasmussen (10) Patent No.: US 11,801,701 B2
(45) Date of Patent: *Oct. 31, 2023

(54) PAPER FOR TRANSFER PATTERN PRINTING

(71) Applicant: Beaver Paper & Graphic Media, Inc., Lawrenceville, GA (US)

(72) Inventor: Knud Villefrance Rasmussen, Silkeborg (DK)

(73) Assignee: BEAVER PAPER & GRAPIC MEDIA, INC., Lawrenceville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,021

(22) Filed: Sep. 12, 2022

(65) Prior Publication Data

US 2023/0073763 A1  Mar. 9, 2023

Related U.S. Application Data

(62) Division of application No. 14/116,414, filed as application No. PCT/DK2012/050151 on May 7, 2012, now Pat. No. 11,440,335.

(30) Foreign Application Priority Data

May 10, 2011 (DK) .................................. 2011 00358

(51) Int. Cl.
| | |
|---|---|
| *B41M 5/025* | (2006.01) |
| *D06P 5/00* | (2006.01) |
| *D21H 17/17* | (2006.01) |
| *D21H 17/28* | (2006.01) |
| *D21H 17/35* | (2006.01) |
| *D21H 17/37* | (2006.01) |
| *D21H 19/22* | (2006.01) |
| *D21H 19/48* | (2006.01) |
| *D21H 19/54* | (2006.01) |
| *D21H 19/58* | (2006.01) |
| *C09D 103/00* | (2006.01) |
| *C09D 125/14* | (2006.01) |
| *B41M 5/00* | (2006.01) |
| *D06P 5/28* | (2006.01) |
| *D06P 5/24* | (2006.01) |
| *B41M 5/035* | (2006.01) |

(52) U.S. Cl.
CPC ......... *B41M 5/0256* (2013.01); *C09D 103/00* (2013.01); *C09D 125/14* (2013.01); *D06P 5/003* (2013.01); *D06P 5/004* (2013.01); *D21H 17/17* (2013.01); *D21H 17/28* (2013.01); *D21H 17/35* (2013.01); *D21H 17/37* (2013.01); *D21H 19/22* (2013.01); *D21H 19/48* (2013.01); *D21H 19/54* (2013.01); *D21H 19/58* (2013.01); *B41M 5/0035* (2013.01); *B41M 5/025* (2013.01); *B41M 5/0355* (2013.01)

(58) Field of Classification Search
CPC .. B41M 5/0256; B41M 5/0035; B41M 5/025; B41M 5/0355; D06P 5/003; D06P 5/004; D21H 17/17; D21H 17/28; D21H 17/35; D21H 17/37; D21H 19/22; D21H 19/48; D21H 19/54; D21H 19/58; C09D 103/00; C09D 125/14

See application file for complete search history.

(56) References Cited

U.S. PATENT DOCUMENTS

| | | | |
|---|---|---|---|
| 6,361,852 B1 * | 3/2002 | Gu .................... | B41M 5/506 428/32.17 |
| 11,440,335 B2 * | 9/2022 | Rasmussen ............ | D21H 19/22 |

FOREIGN PATENT DOCUMENTS

JP     2004/021197 A  *  1/2004  ............... G03G 7/00

* cited by examiner

*Primary Examiner* — Amina S Khan
(74) *Attorney, Agent, or Firm* — Thomas|Horstemeyer, LLP (57) ABSTRACT

The invention relates to a transfer paper (4) for use for transferring a print of ink onto a fabric, said transfer paper comprising: i) a base paper (2); ii) an additive (8) comprising a starch component, and a binding agent; wherein said starch component being a starch selected from the group comprising: unmodified starch or a modified starch or a mixture thereof; and wherein said binding agent being a binding agent selected from the group comprising: an alkyl ketene dimer, a tall oil/fumaric acid copolymer, a styrene/acrylate copolymer and an alkenyl succinic anhydride and a mixture thereof; wherein said base paper (2) comprises an amount of said additive by being impregnated therewith; and wherein said base paper (2) having a water uptake as defined by a Cobb-45 value of 10-100 g/m² and a having a Gurley porosity of 10-140 seconds. The present invention furthermore relates to uses of the transfer paper (4).

17 Claims, 4 Drawing Sheets

PAPER FOR TRANSFER PATTERN PRINTING

CROSS-REFERENCE TO RELATED APPLICATION

This application is a division of U.S. patent application Ser. No. 14/116,414, filed Dec. 27, 2013, now U.S. Pat. No. 11,440,335, which is the National Stage of International Application No. PCT/DK2012/050151, filed May 7, 2012, which claims the benefit of and priority to DK 201100358, filed May 10, 2011, the contents of both of which are incorporated by reference as if fully set forth herein.

TECHNICAL FIELD

The present invention relates in a first aspect to a transfer paper for use for transfer a print of ink onto a fabric and in a second aspect to a process for manufacturing such a transfer paper. The present invention relates in a third aspect to an inked transfer paper for use for transfer of ink to a fabric, and in a fourth aspect to a process for the manufacture of such an inked transfer paper. Furthermore, the present invention relates in a fifth aspect to a process for the manufacture of a dyed fabric. Finally, the present invention relates in a sixth aspect to the use of a transfer paper according to the first aspect or the use of an inked transfer paper according to the third aspect in the manufacture of a dyed product.

BACKGROUND ART

Transfer of ink to a fabric, such as a textile is a well-known method for the manufacture of fabric having a coloured pattern. With the development of inkjet printers during the latest decades it has furthermore been possible to provide such fabrics with quite complicated patterns of dyes.

The known process for the making of a fabric having a coloured pattern by using an inkjet printer involves the following process steps: i) providing a mirror image of the desired pattern on a transfer paper by inkjet printing said mirror imaged pattern onto said transfer paper; ii) contacting the inkjet printed transfer paper with a fabric under the use of heat to assist in making the ink migrate from the paper to the fabric so as to form a mirror image of the mirror-imaged pattern (i.e. a non-inverted pattern) of the ink on the fabric.

It has been known for many years that the nature of the inks suitable for use on textiles does not allow the ink to be printed directly onto the surface of the transfer paper. The reason for this is that the inks used tend to bind strongly to the fibres of the paper, thereby making it difficult to release the inks from the paper in the ink transfer part of the process.

In order to overcome this problem, it has been a widely used practice to coat the transfer paper with a barrier layer prior to the application of the mirror imaged pattern of ink.

Such a barrier layer will prevent the applied ink from adhering to the paper fibres thereby making it much easier to conduct the step of transferring the ink from the paper to the textile.

Typically used barrier layers consist of a carboxy methyl cellulose (CMC), polyvinyl alcohol, alginate, gelatine or mixtures thereof.

Accordingly, WO 00/06392 A1 discloses a transfer paper suitable for inkjet printing comprising a base paper and having one side provided with a barrier layer, wherein the barrier layer having a porosity of at most 100 ml/min. (as determined by the ISO standard 5636.3). In preferred embodiments the barrier coating comprises carboxy methyl cellulose (CMC), polyvinyl alcohol, alginate, gelatine, saccharide syrups or mixtures thereof.

Although such transfer paper having a barrier coating haven proven very useful and versatile in the transfer printing industry there are some drawbacks of this type of transfer paper.

One of these drawbacks is that in order to ensure a sufficient quality of the resulting printed fabric it is essential that the barrier coating has a thickness that is sufficiently high in order to ensure that the ink printed onto the surface of the transfer paper will not migrate into the fibres of the paper, Therefore, in order to ensure that the barrier layer will be applied onto the transfer paper in an even and a sufficient amount the step of application of the barrier layer must be performed in a highly controlled and slow manner.

It is not unusual that in order to obtain a barrier coating having the desired barrier effect it is necessary to make a double coating of the barrier layer; that is two layers of barrier coating, such as CMC are often necessary. This double application is furthermore often performed with an intermittent drying.

Such a requirement of controlling the step of application of the barrier layer and the requirement that this step must be performed relatively slow obviously makes the resulting transfer paper rather expensive.

It is a fact that the manufacturing step of application of the barrier onto the paper in the manufacture of the prior art transfer papers indeed is the bottle neck of the associated process in the sense that the step of application of the barrier onto the paper is the slowest step in the manufacture of such a paper.

Furthermore, the high price of the coating material itself of the barrier layer is reflected on the cost of the prior art coated transfer paper.

The fact that the prior art type of transfer paper due to its layered structure where a barrier layer of e.g. carboxy methyl cellulose (CMC) is applied to a paper necessitates a relatively large amount of coating material of the barrier layer as mentioned above is reflected in the use of as much as 10 g CMC coating (dry content) per $m^2$.

The cost problem associated with the manufacture of the prior art transfer papers is even more profound when one acknowledged that once the ink printed transfer paper having transferred its ink to a fabric, the remaining paper now depleted of ink is of no use whatsoever and must be discarded.

Accordingly, there exists a need for an improved transfer paper which overcomes the above stated disadvantaged.

BRIEF DESCRIPTION OF THE INVENTION

This need is fulfilled according to a first aspect according to the present invention relating to a transfer paper for use for transferring a print of ink onto a fabric, said transfer paper comprising:
  i) a base paper;
  ii) an additive comprising a starch component, and a binding agent;
   wherein said starch component being a starch selected from the group comprising: unmodified starch or a modified starch or a mixture thereof; and
   wherein said binding agent being a binding agent selected from the group comprising: an alkyl ketene dimer, a tall oil/fumaric acid copolymer, a styrene/acrylate copolymer and an alkenyl succinic anhydride and a mixture thereof; and wherein said base paper comprises an amount of said additive by being impregnated therewith;

wherein said base paper having a water uptake as defined by a Cobb-45 value of 10-100 g/m² and a having a Gurley porosity of 10-140 seconds.

It has surprisingly been found that the transfer paper according to the first aspect of the present invention provides for a transfer paper having a quality corresponding to the prior art transfer appear comprising a barrier layer of CMC or the like.

In addition to providing a transfer paper having a quality similar to the prior art transfer papers, the transfer paper according to the first aspect of the present invention can be produced at a fraction of the cost of the prior art papers using a barrier layer of CMC or the like. This cost reduction is a consequence of higher production rate and use of less amounts of additive to be applied onto the base paper from which the transfer paper is made.

Accordingly, the prior art type of transfer paper due to its layered structure where a barrier layer of e.g. CMC is applied to a paper necessitates a relatively large amount of coating material of the barrier layer, which ads unnecessary costs and prolonged production time to the manufacture of the transfer paper.

This allegation is substantiated by the fact that in contrast to prior art types of transfer paper having a barrier layer of e.g. CMC in a dry weight of up to 10 g/m², the content of the impregnation additive of the transfer paper according to the first aspect of the present invention may be as little as 1.7 g/m².

Accordingly, the production price of the transfer paper according to the present invention can be reduced to a price of approximately 35%, compared to the production price of a traditional CMC type transfer paper.

In a second aspect, the present invention relates to a process for manufacturing a transfer paper according to the first aspect of the present invention, said process comprising the steps:
  a) providing a base paper;
  b) impregnating said base paper with an additive as defined in respect of the transfer paper according to the first aspect of the present invention;
  c) drying the impregnated paper obtained in step b)

In a third aspect, the present invention relates to an inked transfer paper for use for transfer of ink to a fabric, said transfer paper comprising a transfer paper according to first aspect of the present invention and one or more inks applied to the surface of said transfer paper.

The present invention relates in a fourth aspect to a process for the manufacture of an inked transfer paper according to the second aspect of the present invention, and comprising the steps:
  a) designing a data representation of a predetermined pattern of colours;
  b) feeding an ink jet printer with a transfer paper according to the first aspect of the present invention;
  c) providing said ink jet printer with information corresponding to said data representation of said pattern of colours obtained in step a);
  d) allowing said ink jet printer to print a pattern of colours onto the transfer paper, said pattern of colours corresponding to the predetermined pattern of colours designed in step a).

In a fifth aspect the present invention relates to a process for the manufacture of a dyed fabric, said process comprising the steps of:
  a) providing an inked transfer paper according to the third aspect of the present invention;
  b) providing a fabric;
  c) contacting the inked transfer paper obtained in step a) and the fabric obtained in step b);
  d) optionally applying heat during step c).

The present invention finally in a sixth aspect relates to use of a transfer paper according to the first aspect of the present invention, or an inked transfer paper according to according to the second aspect of the present invention in the manufacture of a dyed product.

DETAILED DESCRIPTION OF THE INVENTION

The Transfer Paper According to a First Aspect of the Present Invention

As described above, according to the first aspect, the present invention relates to a transfer paper 4 for use for transferring a print of ink onto a fabric, said transfer paper comprising:
  i) a base paper 2;
  ii) an additive 8 comprising a starch component, and a binding agent;
  wherein said starch component being a starch selected from the group comprising: unmodified starch or a modified starch or a mixture thereof; and
  wherein said binding agent being a binding agent selected from the group comprising: an alkyl ketene dimer, a tall oil/fumaric acid copolymer, a styrene/acrylate copolymer and an alkenyl succinic anhydride and a mixture thereof; and wherein said base paper 2 comprises an amount of said additive by being impregnated therewith;
  wherein said base paper 2 having a water uptake as defined by a Cobb-45 value of 10-100 g/m² and a having a Gurley porosity of 10-140 seconds.

Accordingly, the transfer paper comprises a base paper which is impregnated with an additive. The additive serves the purpose of impregnating the base paper in such a way that the resulting transfer paper is capable of receiving a transfer printing ink and still be capable of transferring this ink effectively to e.g. a synthetic fabric.

The base paper from which the transfer paper is made must preferably have a water uptake as defined by a Cobb-45 value of 10-100 g/m² and a having a Gurley porosity of 10-140 seconds.

The Cobb-45 value is an expression of how much water the paper can adsorb and it is measured according to the Cobb-45 standard which is well-known for a person skilled in the art of paper manufacturing. The Cobb-45 procedure is disclosed in the standard SS-EN 20535.

The Gurley porosity is an expression of the porosity of the paper it is measured according to the Gurley standard which is well-known for a person skilled in the art of paper manufacturing. The Gurley procedure is disclosed in the standard ISO 5636-5.

In a preferred embodiment of the transfer paper according to the first aspect of the present invention said base paper 2 having a water uptake as defined by a Cobb-45 value of 15-95 $g/m^2$, such as 20-90 $g/m^2$, for example 25-85 $g/m^2$, e.g. 30-80 $g/m^2$, such as 35-75 $g/m^2$, for example 40-70 $g/m^2$, such as 45-65 $g/m^2$ or 50-60 $g/m^2$.

It is preferred that said base paper 2 having water uptake as defined by a Cobb-45 value of 25-50 $g/m^2$, such as 30-45 $g/m^2$, such as 35-40 $g/m^2$.

In a preferred embodiment of the transfer paper according to the first aspect of the present invention said base paper 2 having a Gurley porosity of 15-170 seconds, such as 20-165 seconds, e.g. 25-160 seconds, such as 30-155 seconds, for example 35-150 seconds, such as 40-145 seconds, for example 45-140 seconds, such as 50-135 seconds, e.g. 55-130 seconds, such as 60-125 seconds, such as 65-120 seconds or 70-115 seconds, for example 75-110 seconds, such as 80-105 seconds, such as 85-100 seconds or 90-95 seconds.

It is preferred that said base paper 2 having a Gurley porosity of 60-150 seconds, such as 70-140 seconds, e.g. 80-130 seconds, such as 90-120 seconds, for example 100-110 seconds.

Staying within these above ranges of the Cobb-45 and the Gurley values, respectively ensures that the base paper is capable of being impregnated with the chosen additive in such a way that the resulting transfer paper is capable to receive a transfer printing ink and still be capable of transferring this ink effectively to e.g. a synthetic fabric.

The base paper 2 of the transfer paper 4 according to the first aspect of the present invention, preferably is having a weight of 15-155 $g/m^2$, for example 20-150 $g/m^2$, such as 25-145 $g/m^2$ for example 30-140 $g/m^2$, such as 35-135 $g/m^2$, such as 40-130 $g/m^2$, such as 45-125 $g/m^2$, e.g. 50-120 $g/m^2$, such as 55-115 $g/m^2$, for example 60-110 $g/m^2$, e.g. 65-105 $g/m^2$, for example 70-100 $g/m^2$, such as 75-95 $g/m^2$ or 80-90 $g/m^2$.

It is preferred that the base paper 2 of the transfer paper 4 according to the first aspect of the present invention is having a weight of 30-80 $g/m^2$, such as 40-70 $g/m^2$, such as 50-60 $g/m^2$.

These stated ranges of the weight of the base paper have shown to be a fine compromise between strength and production economy of the resulting transfer paper.

In one embodiment of the present invention base paper 2 is based on either bleached or unbleached cellulose fibres or a mixture thereof.

The additive with which the base paper is impregnated is an additive comprising a starch component, and a binding agent. The starch component being a starch selected from the group comprising: unmodified starch or a modified starch or a mixture thereof.

In one embodiment of the present invention, the starch component comprises an unmodified starch.

In a preferred embodiment of the present invention, the starch component comprises a modified starch selected from the group comprising: an acid modified starch, an alkali modified starch, a bleached starch, an oxidised starch, an enzyme treated starch, an acetylated starch, an hydroxypropylated starch, a hydroxyethylated starch, and a carboxymethylated starch and a mixture thereof.

In a preferred embodiment of the first aspect of the present invention, the amount of the starch component in the additive 8 is 50-99.99 weight-%, such as 52-98 weight-%, for example 54-96 weight-%, e.g. 56-94 weight-%, such as 58-92 weight-%, such as 60-90 weight-%, for example 62-88 weight-%, such as 64-86 weight-%, such as 66-84 weight-%, for example 68-82 weight-%, e.g. 70-80 weight-%, such as 72-78 weight-%, such as 74-76 weight-%, all percentages being dry weight percentages based on the total amount of additive.

It is preferred that the amount of the starch component in the additive 8 is 62-88 weight-%, such as 64-86 weight-%, e.g. 66-84 weight-%, such as 68-82 weight-%, for example 70-80 weight-%, e.g. 72-78 weight-%, such as 74-76 weight-% based on the total amount of additive.

An example of a useful starch to be used in the additive for the base paper is of the type Redifilm 5800 from (National Starch & Chemical).

The binding agent being a binding agent selected from the group comprising: an alkyl ketene dimer, a tall oil/fumaric acid copolymer, a styrene/acrylate copolymer and an alkenyl succinic anhydride and a mixture thereof.

The purpose of the binding agent is one the one hand to bind the starch component to the paper and is on the other hand to adjust the uptake of moist of the paper, thereby acting as a hydrophobia providing agent.

In a preferred embodiment of the first aspect of the present invention, the amount of the binding agent in the additive 8 is 0.01-50 weight-%, such as 2-48 weight-%, for example 4-46 weight-%, e.g. 6-44 weight-%, such as 8-42 weight-%, such as 10-40 weight-%, for example 12-38 weight-%, such as 14-36 weight-%, such as 16-34 weight-%, for example 18-32 weight-%, e.g. 20-30 weight-%, such as 22-28 weight-%), such as 24-26 weight-%, all percentages being dry weight percentages based on the total amount of additive.

It is preferred that the amount of the binding agent in the additive 8 is 12-38 weight-%, such as 14-36 weight-%, e.g. 16-34 weight-%, such as 18-32 weight-%, such as 20-30 weight-%, e.g. 22-28 weight-%, such as 24-26 weight-%.

Examples of useful binding agents to be used in the additive for the base pase paper are: Eka DR 25 XL—an alkyl keten dimer (from Eka Chemicals, Sweden), Eka SP AE 76—a styrene/acrylate copolymer (from Eka Chemicals, Sweden), Acronal S 305 D—a styrene/acrylate copolymer (from BASF, Germany), T-Lim 35 J—a tall oil/fumaric acid copolymer (from Hercules, Sweden).

The additive is preferably applied to the base paper in a wet state, such as in a suspension in an aqueous solvent such as in water.

In a preferred embodiment of the first aspect of the present invention the density of said additive 8 on said base paper 4 is 0.5-15 $g/m^2$, such as 1-14 $g/m^2$, such as 2-13 $g/m^2$, for example 3-12 $g/m^2$, such as 4-11 $g/m^2$, e.g. 5-10 $g/m^2$, such as 6-9 $g/m^2$ or 7-8 $g/m^2$, said density ranges being based on the dry content of the additive 8.

It is preferred that the density of said additive 8 on said base paper 4 is 2-13 $g/m^2$, such as 3-12 $g/m^2$, for example 4-11 $g/m^2$, such as 5-10 $g/m^2$, such as 6-9 $g/m^2$, e.g. 7-8 $g/m^2$.

In two different embodiments of the first aspect of the present invention, the format of the transfer paper is either in a sheet format or in a length format.

In contrast to the prior art transfer papers wherein a layer of e.g. CMC is applied onto the surface of a base paper, the transfer paper according to the first aspect of the present invention is impregnated with an additive which accordingly extends into said base paper. Hence, the transfer paper according to the present invention is not merely a base paper having a barrier layer on its surface. Rather the additive extends into the paper's internal fibrous structure.

In a preferred embodiment of the first aspect of the present invention the concentration of said additive 8 is varying throughout the thickness of the transfer paper in such a way that said concentration gradually diminishes in going from one side of the paper to the central part of said paper.

The Process for the Manufacture of the Transfer Paper According to the Second Aspect of the Present Invention In a second aspect, the present invention relates to a process for manufacturing a transfer paper 4 according to the first aspect, and comprising the steps:
 a) providing a base paper 2;
 b) impregnating said base paper with an additive 8 as defined in as defined in respect of the transfer paper according to the first aspect of the present invention;
 c) drying the impregnated paper obtained in step b);

Accordingly, the process of the second aspect of the present invention simply comprising impregnating a base paper with the additive as defined for the transfer paper according to the first aspect of the present invention.

The impregnation of the base paper may take place in any suitable way.

It is preferred that the additive is applied to the base paper in a wet state, such as in a suspension in an aqueous solvent such as in water.

Figure 1:
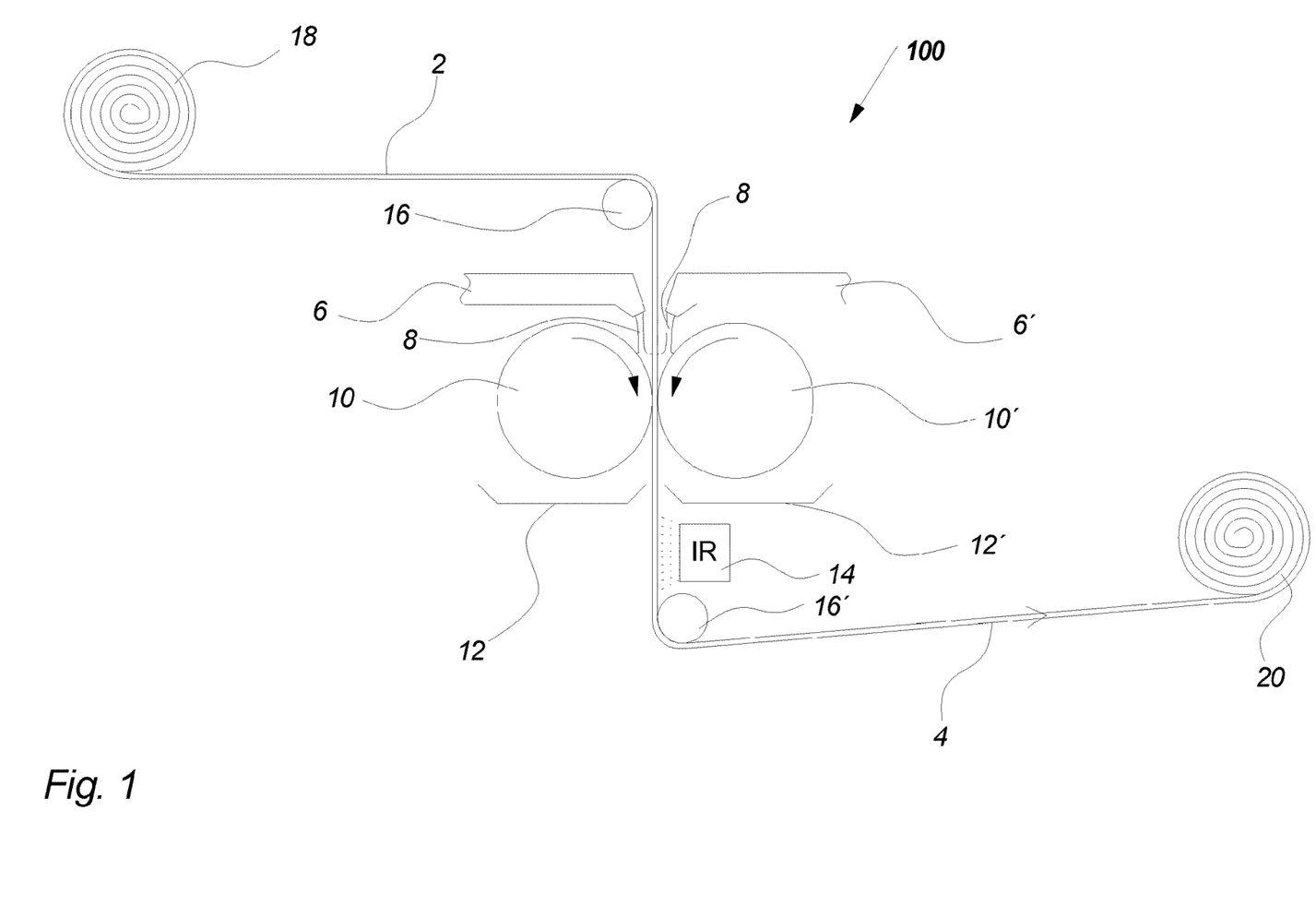
FIG. 1 illustrates the process of manufacture of a transfer paper according to a first and a second aspect of the present invention.

In one embodiment of the second aspect of the present invention the base paper 2 used in step a) has the format of a length of paper and wherein step b) is performed in a size press by moving said length of base paper through two calendar rolls 10, 10', and wherein the additive 8 is applied to the base paper at a position located upstream in relation to the calendar rolls and in relation to the movement of the base paper.

Such a process is illustrated in FIG. 1.

This embodiment has show to be an efficient way of impregnating the base paper.

In one embodiment of the first aspect of the present invention step c) is performed by irradiating the impregnated paper with IR radiation and/or by subjecting said paper to a hot air stream.

It is preferred that the drying step c) is performed at a position located downstream in relation to said calendar rolls 10,10'.

By irradiating the impregnated paper with IR radiation at a position located downstream in relation to said calendar rolls 10, 10', an effective drying of the paper is obtained.

Using irradiation via IR radiation has proven to be an effective way of drying the paper. Alternatively, hot air may be used for drying.

In one embodiment of the first aspect of the present invention step b) is performed by impregnating said base paper 2 on one or on both sides of said base paper.

Impregnation on both sides of the base paper 2 is an efficient way of making the paper adsorb the applied additive.

The Inked Transfer Paper According to the Third Aspect of the Present Invention

In a third aspect, the present invention relates to an inked transfer paper 9 for use for transfer of ink 22 to a fabric, said inked transfer paper 9 comprising a transfer paper 4 according to the first aspect of the present invention and one or more inks 22 applied to the surface of said transfer paper.

The inked transfer paper according to the third aspect of the present invention may have any format or dimensions.

However, in one embodiment of the third aspect of the present invention the inked transfer paper 9 has a format of a sheet or the format of a length.

A sheet format shall in the present description and the appended claims be understood to be a format of a paper, preferably a rectangular format of a paper wherein the length is five times the width of the paper or less.

A length format shall in the present description and the appended claims be understood to be a format of a paper, preferably a rectangular format of a paper wherein the length is more than five times the width of the paper.

In one embodiment of the third aspect of the present invention said one or more inks 22 are traditionally and/or conventionally ink-jet inks, such as inks comprising glycerol and one or more dyes.

Typically, inks of the colours black, cyan, magenta and yellow are used.

Examples of useful inkjet inks to be used in the manufacture of the inked transfer paper are: S4 Subli Black 774, Elvajet Ultra Black SE 101, S4 Subli Cyan 770 Light, S4 Subli Cyan 770, Elvajet Blue SE 100, S4 Subli Magenta 770 Light, S4 Subli Magenta 770, Elvajet Magenta SE 100, S4 Subli Yellow 781, Elvajet Yellow SE 100, all from the supplier Sensient, Switzerland.

The Process for the Manufacture of the Inked Transfer Paper According to the Fourth Aspect of the Present Invention In a fourth aspect, the present invention relates to a process for the manufacture of an inked transfer paper 9 according to the third aspect, and comprising the steps:
 a) designing a data representation of a predetermined pattern of colours;
 b) feeding an ink jet printer 200 with a transfer paper 4 according to the first aspect of the present invention;
 c) providing said ink jet printer 200 with information corresponding to said data representation of said pattern of colours obtained in step a);
 d) allowing said ink jet printer 200 to print a pattern of colours onto the transfer paper, said pattern of colours corresponding to the predetermined pattern of colours designed in step a).

It has been found easy and convenient to apply an industrial inkjet printer for the purpose of manufacturing an inked transfer.

Such industrial inkjet printers are commercially available and are also used for manufacturing the prior art inked transfer paper based on a base paper and a surface barrier layer comprising e.g. CMS.

Examples of such industrial inkjet printers are: the Mimaki JV 33 and the Roland RS-640.

Any kind of ink suitable for chemically bonding to a fabric, such as one comprising a synthetic polymer may be used.

In the present description and the appended claims the term "colour" shall be understood to mean any colour available within the visible spectrum and also substances reflecting UV light. The term "colour" shall also encompass the "non-colour" black as it is common in the everyday usage of the term "black".

Typically, a combination of inks to be applied with the inkjet printer has the colours: black, cyan, magenta and yellow, respectively.

As the pattern of the surface of the transfer paper is an inverted version of the corresponding pattern appearing on the surface of the fabric onto which the pattern will be transferred, it is preferred that the pattern of colours on the transfer paper 4 printed in step d) is a mirror image of the pattern of colours obtained in step a).

Figure 2:
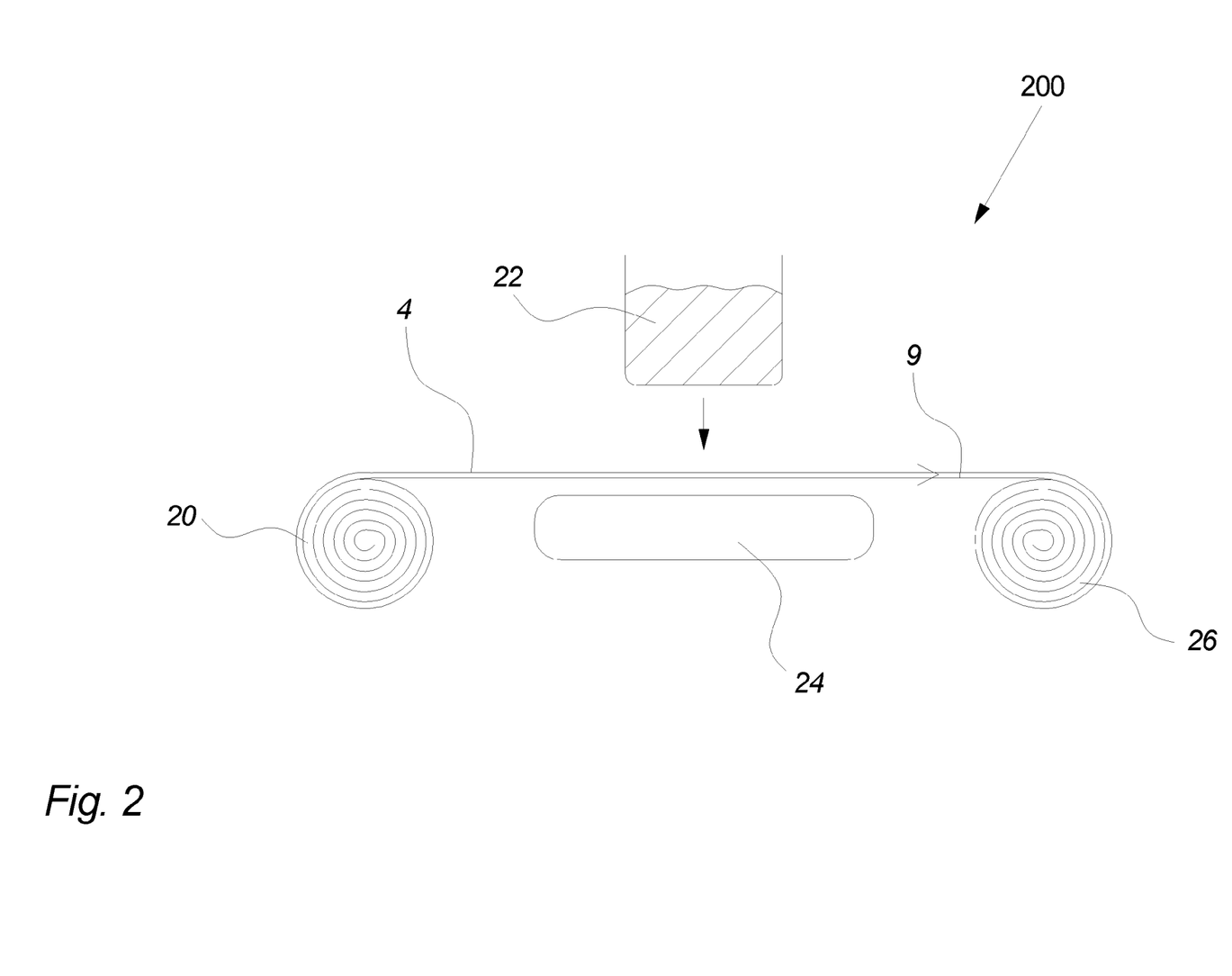
FIG. 2 illustrates the process of the manufacture of an inked transfer paper according to a third and a fourth aspect of the present invention.

FIG. 2 illustrates the principles of manufacturing the inked transfer paper 9 according to the third and fourth aspect of the present invention on an industrial ink jet printer 200.

The Process for the Manufacture of a Dyed Fabric According to the Fifth Aspect of the Present Invention In a fifth aspect, the present invention relates to a process for the manufacture of a dyed fabric 36, said process comprising the steps of:
 a) providing an inked transfer paper 9 according to the first aspect of the present invention;
 b) providing a fabric 34;
 c) contacting the inked transfer paper obtained in step a) and the fabric obtained in step b);
 d) optionally applying heat during step c).

Accordingly, the printed pattern printed onto the transfer paper according to the first aspect of the present invention is in the process of the fifth aspect transferred to a fabric by contacting said printed transfer paper with said fabric.

Figure 3:
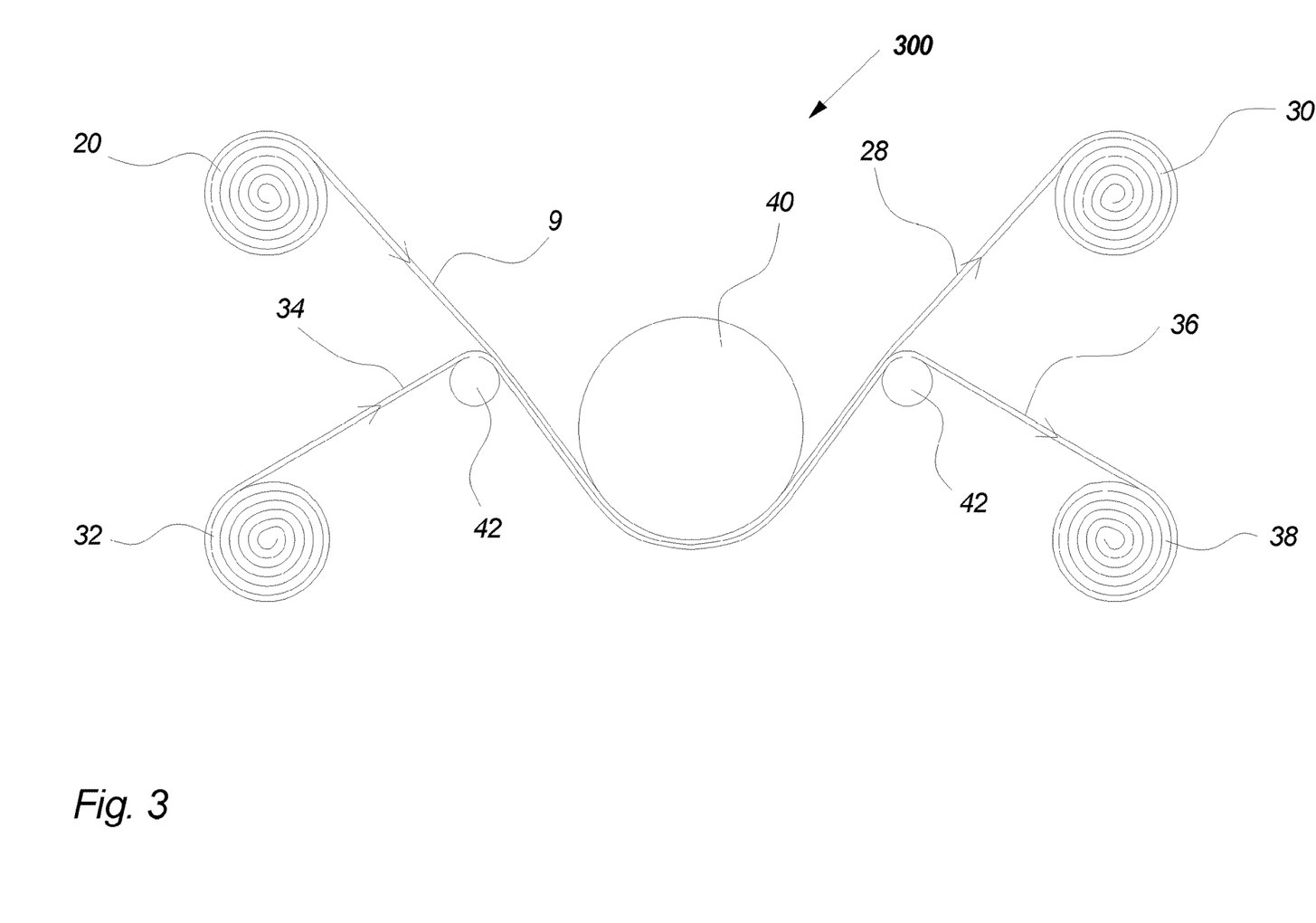
FIG. 3 illustrates the process of the manufacture of a dyed fabric according to a fifth aspect of the present invention.

In one embodiment of the fifth aspect of the present invention the inked transfer paper 9 and the fabric 34 are both having a length format and step c) is performed by concurrently leading the length of inked transfer paper 9 and the length of fabric 34 through a transfer calendar 300.

This process is outlined in FIG. 3.

In one embodiment of the fifth aspect of the present invention heat is provided in step c).

Heat will expedite the transfer of the ink from the inked transfer paper to the fabric.

In one embodiment of the fifth aspect of the present invention the inked transfer paper 9 and the fabric 34 are both having a sheet format and step c) and optionally step d) are performed in a flat bed press.

In one embodiment of the fifth aspect of the present invention, the fabric 34 is an acrylic fabric, a nylon fabric, such as a (6,6)-polyamide fabric, a triacetate fabric or a polyester fabric or mixtures thereof.

In essence there is no limit on the type of fabric to be used as long as the ink used is capable of chemically bonding to the fibres of said fabric.

The Use of a Transfer Paper According to the Sixth Aspect of the Present Invention In a sixth aspect, the present invention relates to a use of a transfer paper 4 according to the first aspect of the present invention, or a use of an inked transfer paper 9 according to the first aspect of the present invention in the manufacture of a dyed product.

In one embodiment of the sixth aspect of the present invention the dyed product is a fabric 34 in a sheet or a length format.

In another embodiment of the sixth aspect of the present invention the use is for the purpose of making a patterned fabric for use as a clothing textile, a flag, an advertising banner, a domestic textile, such as a curtain, furniture fabric, a textile for medical use, such as for stomi receptables, wallpaper, upholstery for automobiles, sail for a sailboat, a sprayhood for a boat.

In yet another embodiment of the sixth aspect of the present invention the use is for the purpose of making a patterned inked transfer paper for use for printing on a hard surface.

In a preferred embodiment this use relates to the manufacture of a dyed hard surface, where the hard surface is a surface of a synthetic polymer, such as the surface of a ski, lamella for window blinds for blinding a window, such as a coated window blind coated with a synthetic coating.

In the following sections, the present invention is explained with reference to the accompanying drawings.

FIG. 1 illustrates the manufacture of a transfer paper according to a first aspect of the present invention. The manufacture takes place on a size press 100.

The size press 100 is loaded with a roll 18 of base paper 2 which is guided via the cylinders 16, 16'. Between the cylinders 16,16' the base paper 2 is applied with an additive 8 on both sides of the base paper via the application nozzles 6,6'. The base paper which has been applied with additive is subsequently passed through a pair of calander cylinders 10, 10' which may be heated. In this way the base paper which has been applied with an additive is impregnated.

Collectors 12,12' may be present below the calander cylinders 10,10' in order to collect excessive additive. Downstream in relation to the calander cylinders a heating source, such as an IR radiation device 14 serves the purpose of drying the impregnated paper. Downstream of the heating source, the transfer paper 4 is rolled onto a roll 20.

FIG. 2 illustrates the manufacture of a dyed transfer paper according to a second and a third aspect of the present invention. The manufacture takes place on an industrial printer 200.

In the industrial printer 200 the inventive transfer paper 4 is passed from one roll 20 and is rolled onto another roll 26. In-between the rolls 20 and 26 inks 22 are printed onto the surface of the transfer paper. In the printing area the transfer paper is supported by a support plate 24.

FIG. 3 illustrates the process of transferring ink from an inked transfer paper 9 rolled onto a roll 20 to a blank fabric 34 rolled onto a roll 32. The process takes place in a transfer calander 300. The inked transfer paper is brought into contact with the blank fabric 34 by concurrently moving the inked transfer paper 9 and the blank fabric 34 partly around the surface of a calendar cylinder 40. The cylinder rolls 42 aids in guiding the paper and the fabric. Around the surface of the calendar cylinder the speed of movement of the inked transfer paper and the speed of movement of the blank fabric 34 is essentially the same.

Heat supplied from for example the internal of and to the surface of the calendar cylinder 40 may facilitate the transfer of the ink from the inked transfer paper 9 to the blank fabric 34.

Subsequent to leaving the calander cylinder 40, the paper will be depleted from essentially all of the ink on the transfer paper. On the other hand the blank fabric 34 have become dyed by having received a coloured pattern originating from the ink supplied to the blank fabric 34 from the inked transfer paper 9. The depleted transfer paper 28 is rolled onto a roll 30 and will subsequently be discarded or reused in a paper manufacturing process.

The fabric 36 now comprising a coloured pattern will be rolled onto a roll 38.

Figures 4A, 4B:
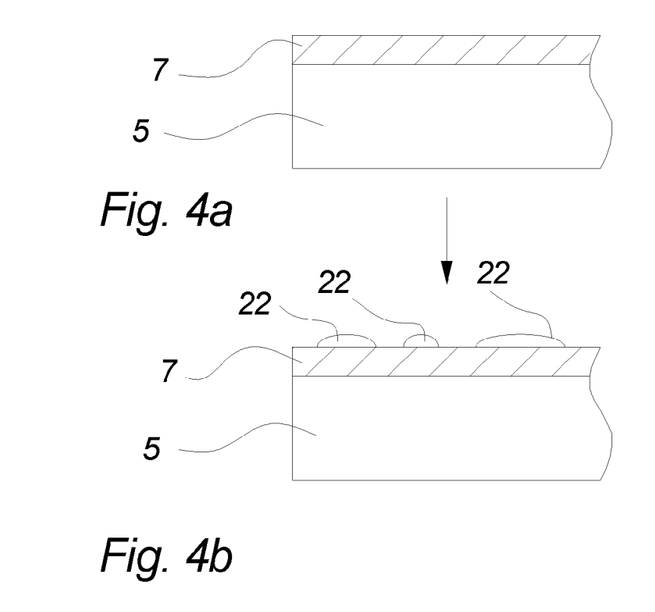
FIGS. 4a, 4b and FIGS. 5a, 5b illustrate the different structure of an inked transfer paper according to the present invention, compared to the prior art transfer papers.
Figures 5A, 5B:
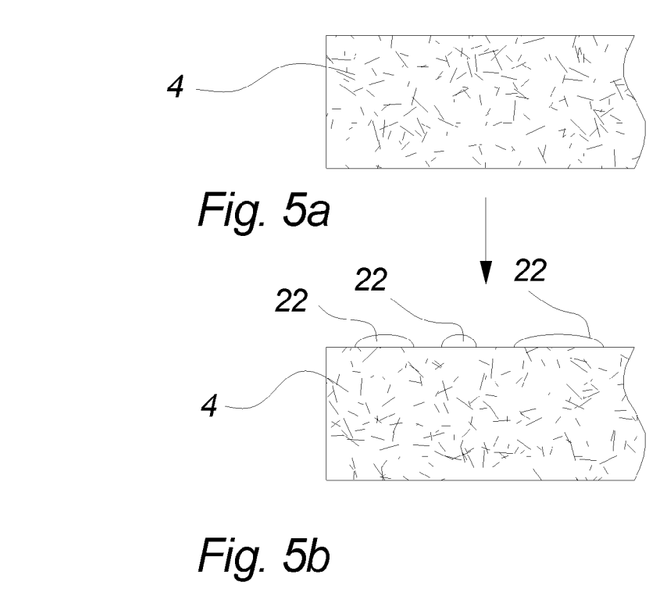

FIGS. 4a and 4b on the one hand and FIGS. 5a and 5b on the other hand illustrate the structural differences of the transfer paper according to prior art compared to the transfer paper according to the first aspect of the present invention. FIGS. 4a and 4b show that the prior art transfer paper 5,7 comprises a paper 5 onto the surface of which is applied a barrier layer of e.g. CMC. The ink 22 applied onto the prior art paper 5,7 will be applied onto the barrier layer 7 of the paper 5.

In contrast, in the transfer paper according to the first aspect of the present invention, no barrier layer is present on the surface of a base paper. Rather the base paper 2 is impregnated with an additive extending throughout the internal fibrous structure of said paper. Upon printing of ink

22 to the transfer paper according to the first aspect of the present invention, the ink 22 will be applied onto the surface of the inked transfer paper as shown in FIGS. 5*a* and 5*b*.

EXAMPLES

Example 1

This example illustrates the preparation of a transfer paper according to the present invention. Base paper from a roll of commercially available base paper was impregnated with an additive comprising a starch component and a binding agent.

The additive was a mixture of starch of the type Redifilm 5800 and a styrene/acrylate copolymer of the type Eka SP AE 76. The additive was obtained by mixing in a mixer 225 l Redifilm 5800 and 45 l Eka SP AE 76 with 780 l water and 120 antifoaming agent.

The base paper was a cellulose paper made from virging fibres. It had a weight of 53 g/m$^2$, a Cobb-45 value of 56 g/m$^2$ and a Gurley porosity of 70 seconds. The base paper had a width of 320 cm and a length of 20,000 m.

The base paper roll was loaded onto a size press of the type Yankee. The machine was started and the base paper was impregnated with the additive by leading the base paper in a lengthwise direction through two calendar rolls, and wherein the additive was applied to the base paper at a position located upstream in relation to the calendar rolls and in relation to the movement of the base paper.

The speed of the paper passing through the machine was 250 m/min and the amount of the applied additive was adjusted so as to obtain a density of the resulting transfer paper of 55 g/m$^2$. Prior to being rolled onto a paper roll, the paper was dried.

The resulting transfer paper had a water uptake as defined by a Cobb-45 value of 40 g/m$^2$ and a Gurley porosity of 500 seconds.

Example 2

This example illustrates the preparation of an alternative transfer paper according to the present invention.

The same base paper as used in example 1 was used in this example. The same procedure for impregnating the base paper as in example 1 was used.

In example 2, Redifilm 5800 was used as the source of the starch. In example 2 however, a binding agent in the form of an alkyl ketene dimer having the trade name Eka DR 25 XL was used.

The relative amounts of the starch and the binding agent were 93 wt % starch and 7 wt % binding agent, (dry weight content), respectively.

The resulting impregnated paper exhibited excellent properties in use as a transfer paper.

Example 3

This example illustrates the preparation of an alternative transfer paper according to the present invention.

The same base paper as used in example 1 was used in this example. The same procedure for impregnating the base paper as in example 1 was used.

In example 3, Redifilm 5800 was used as the source of the starch. In example 3 however, a binding agent in the form of a tall oil/fumaric acid copolymer having the trade name T-lim 35 J was used.

The relative amounts of the starch and the binding agent were 90 wt % starch and 10 wt % binding agent, (dry weight content), respectively.

The resulting impregnated paper exhibited excellent properties in use as a transfer paper.

Example 4

This example illustrates the preparation of an alternative transfer paper according to the present invention.

The same base paper as used in example 1 was used in this example. The same procedure for impregnating the base paper as in example 1 was used.

In example 4, Redifilm 5800 was used as the source of the starch. In example 4 however, a binding agent in the form of a styrene/acrylate copolymer having the trade name Acronal S 305 D was used.

The relative amounts of the starch and the binding agent were 80 wt % starch and 20 wt % binding agent (dry weight content), respectively.

The resulting impregnated paper exhibited excellent properties in use as a transfer paper.

Example 5

This example illustrates the manufacture of an inked transfer paper according to the present invention.

Transfer paper of the type manufactured in example 1 was loaded on an ink jet printer of the type Roland RS-640. The ink jet printer was supplied with ink of the type Elvajet (black, cyan, magenta and yellow).

A print pattern comprising a spectrum of different colours was created on a personal computer. A representation of this pattern was sent to the inkjet printer via the corresponding software associated with the inkjet printer.

The printer was allowed to print the predetermined pattern on a length of the transfer paper of example 1.

The applied ink was readily adsorbed by the paper and the additive and the paper was sufficiently dry for packaging by rolling without any smearing of the ink occurring.

Example 6

This example illustrates the manufacture of an inked transfer paper according to the present invention.

The transfer paper from example 2 was loaded on an ink jet printer of the type Mimaki JV 33. The ink jet printer was supplied with ink of the type S4.Subli.770 (black, cyan, magenta and yellow).

A print pattern comprising a spectrum of different colours was created on a personal computer. A representation of this pattern was sent to the inkjet printer via the corresponding software associated with the inkjet printer.

The printer was allowed to print the predetermined pattern on a length of the transfer paper of example 2.

The applied ink was readily adsorbed by the paper and the additive and the paper was sufficiently dry for packaging by rolling without any smearing of the ink occurring.

Example 7

This example illustrates the transfer of ink from an inked transfer paper to a synthetic fabric.

The inked transfer paper from example 6 was loaded onto a transfer calander machine (Klievrik T130). The calander temperature was adjusted to 210° C. The speed of the paper was adjusted so that the paper had a contact time on the calander rolls of 25 seconds. The pressure on the calander rolls was 3 bar. A polyester fabric of width 160 cm and length 100 m was fed concurrently through the machine together with the paper.

The inked fabric was dried before being rolled onto a roll. A quality control revealed that the obtained transferred ink pattern on the fabric was as high as on an inked fabric made by transferring the same ink pattern from a traditional transfer paper having a barrier coating of CMC.

The invention claimed is:

1. A transfer paper for use for transferring a print of ink onto a fabric, said transfer paper comprising:
   i) a base paper;
   ii) an additive comprising a starch component, and a binding agent;
   wherein said starch component being a starch selected from the group consisting of: unmodified starch, a modified starch, and a mixture thereof; and
   wherein said binding agent being a binding agent selected from the group consisting of: an alkyl ketene dimer, a tall oil/fumaric acid copolymer, a styrene/acrylate copolymer and an alkenyl succinic anhydride, and a mixture thereof; and
   wherein said base paper comprises an amount of said additive by being impregnated therewith;
   wherein said base paper impregnated with said additive has a water uptake as defined by a Cobb-45 value of 10-100 g/m2 and a having a Gurley porosity of 15-170 seconds.

2. The transfer paper according to claim 1, wherein said base paper having a weight of 30-80 g/m$^2$.

3. The transfer paper according to claim 1, wherein said base paper having water uptake as defined by a Cobb-45 value of 25-50 g/m$^2$.

4. The transfer paper according to claim 1, wherein said base paper having a Gurley porosity of 60-150 seconds.

5. The transfer paper according to claim 1, wherein the amount of the starch component in the additive is 62-88 weight-%, the percentages being dry weight percentages based on the total amount of additive.

6. The transfer paper according to claim 1, wherein the amount of the binding agent in the additive is 12-38 weight-%, the percentages being dry weight percentages based on the total amount of additive.

7. The A transfer paper according to claim 1, wherein the density of said additive on said base paper is 2-13 g/m$^2$, said density range being based on the dry content of the additive.

8. The transfer paper according to claim 1, wherein said base paper having a weight of 15-155 g/m$^2$.

9. The transfer paper according to claim 1, wherein the amount of the starch component in the additive is 62-88 weight-%, and the amount of the binding agent in the additive is 12-38 weight-%, the percentages being dry weight percentages based on the total amount of additive.

10. The process for manufacturing a transfer paper according to claim 1 comprising the steps:
    a) providing a base paper;
    b) impregnating said base paper with an additive as defined in claim 1;
    c) drying the impregnated paper obtained in step b).

11. The process according to claim 10 wherein the base paper used in step a) has the format of a length of paper and wherein step b) is performed in a size press by moving said length of base paper through two calendar rolls, and wherein the additive is applied to the base paper at a position located upstream in relation to the calendar rolls and in relation to the movement of the base paper.

12. The process according to claim 10, wherein step c) is performed by irradiating the impregnated paper with IR radiation and/or by subjecting said paper to a hot air stream.

13. The process according to claim 10, wherein step b) is performed by impregnating said base paper on one or on both sides of said base paper.

14. An inked transfer paper for use for transfer of ink to a fabric, said transfer paper comprising a transfer paper according to claim 1 and one or more inks applied to the surface of said transfer paper.

15. A process for the manufacture of an inked transfer paper comprising the steps:
    a) designing a data representation of a predetermined pattern of colours;
    b) feeding an ink jet printer with a transfer paper according to claim 1;
    c) providing said ink jet printer with information corresponding to said data representation of said pattern of colours obtained in step a);
    d) allowing said ink jet printer to print a pattern of colours onto the transfer paper, said pattern of colours corresponding to the predetermined pattern of colours designed in step a).

16. A process for the manufacture of a dyed fabric, said process comprising the steps of:
    a) providing an inked transfer paper according to claim 14;
    b) providing a fabric;
    c) contacting one of the inked transfer paper provided in step a) or the fabric provided in step b) with the other of the fabric provided in step b) or the inked transfer paper provided in step a); and
    d) optionally applying heat during step c).

17. The process according to claim 16, wherein the fabric is an acrylic fabric, a nylon fabric, a triacetate fabric or a polyester fabric or mixtures thereof.

* * * * *